United States Patent
Perdue et al.

(10) Patent No.: US 11,014,751 B2
(45) Date of Patent: *May 25, 2021

(54) DIRECT EDGE DRIVE CONVEYOR BELT

(71) Applicant: Cambridge International, Inc., Cambridge, MD (US)

(72) Inventors: Thomas O. Perdue, Salisbury, MD (US); George H. Messick, Jr., Cambridge, MD (US); Crystal A. Willey, Vienna, MD (US); Frank Salsone, Glen Head, NY (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,444

(22) Filed: May 6, 2019

(65) Prior Publication Data

US 2019/0256294 A1  Aug. 22, 2019

Related U.S. Application Data

(63) Continuation of application No. 15/910,446, filed on Mar. 2, 2018, now Pat. No. 10,280,004.

(60) Provisional application No. 62/466,640, filed on Mar. 3, 2017.

(51) Int. Cl.
| | | |
|---|---|---|
| *B65G 17/08* | (2006.01) | |
| *B65G 21/18* | (2006.01) | |
| *B65G 23/06* | (2006.01) | |
| *B65G 17/06* | (2006.01) | |

(52) U.S. Cl.
CPC ......... *B65G 17/086* (2013.01); *B65G 17/064* (2013.01); *B65G 17/083* (2013.01); *B65G 21/18* (2013.01); *B65G 23/06* (2013.01); *B65G 2812/02396* (2013.01)

(58) Field of Classification Search
CPC .. B65G 21/18; B65G 2207/24; B65G 17/086; B65G 17/064; B65G 17/083; B65G 23/06
USPC .................................................. 198/778, 848
See application file for complete search history.

(56) References Cited

U.S. PATENT DOCUMENTS

| | | |
|---|---|---|
| 3,348,659 A | 10/1967 | Roinestad |
| 4,078,655 A | 3/1978 | Roinestad |
| 4,450,953 A | 5/1984 | Le Cann et al. |
| 4,741,430 A | 5/1988 | Roinestad |
| 4,852,720 A | 8/1989 | Roinestad |
| 4,858,750 A | 8/1989 | Cawley |
| 4,941,566 A | 7/1990 | Irwin |

(Continued)

FOREIGN PATENT DOCUMENTS

WO          9702198 A1       1/1997

OTHER PUBLICATIONS

European Patent Office, Extended European Search Report, Application No. 18159779.0, dated Jul. 23, 2018, 7 pages.

(Continued)

*Primary Examiner* — James R Bidwell
(74) *Attorney, Agent, or Firm* — Quarles & Brady LLP

(57) ABSTRACT

A conveyor belt having a plurality of spaced tractive rods including opposing inner and outer ends, and a support surface transversely disposed with respect to a direction of travel and interconnecting the plurality of spaced tractive rods, wherein at least one of the inner and outer ends of at least some of the plurality of spaced tractive rods includes a cone shaped end portion.

20 Claims, 15 Drawing Sheets

(56) References Cited

U.S. PATENT DOCUMENTS

| | | |
|---|---|---|
| 5,133,449 A | 7/1992 | Spangler |
| 5,139,135 A | 8/1992 | Irwin et al. |
| 5,141,099 A | 8/1992 | Baumgartner |
| 5,310,045 A | 5/1994 | Palmaer et al. |
| 5,318,169 A | 6/1994 | Faulkner et al. |
| 5,346,059 A | 9/1994 | Irwin |
| 5,358,096 A | 10/1994 | Faulkner et al. |
| 5,431,275 A | 7/1995 | Faulkner |
| 5,460,260 A | 10/1995 | Ochs et al. |
| 5,566,817 A | 10/1996 | Meeker |
| 5,775,480 A | 7/1998 | Lapeyre et al. |
| 5,954,187 A | 9/1999 | Hager |
| 6,129,205 A | 10/2000 | Ergenbright et al. |
| 6,484,379 B2 | 11/2002 | Palmaer |
| 6,564,930 B1 | 5/2003 | Colding-Kristensen et al. |
| 6,578,704 B1 | 6/2003 | MacLachlan |
| 6,796,418 B1 | 9/2004 | Harrison et al. |
| 6,837,367 B1 | 1/2005 | Klein et al. |
| 7,070,043 B1 | 7/2006 | MacLachlan et al. |
| 7,410,047 B2 | 8/2008 | van Faassen |
| 7,735,637 B2 | 6/2010 | Montgomery et al. |
| 7,762,388 B2 | 7/2010 | Lago |
| 7,971,707 B2 | 7/2011 | Elsner |
| 7,987,974 B2 | 8/2011 | Montgomery et al. |
| 8,047,356 B2 | 11/2011 | Elsner |
| 8,181,771 B2 | 5/2012 | Talsma |
| 8,302,764 B2 | 11/2012 | Johnson |
| 8,522,960 B2 | 9/2013 | Johnson |
| 8,678,178 B2 | 3/2014 | Bickel, Jr. et al. |
| 8,752,698 B2 | 6/2014 | Lasecki et al. |
| 8,844,713 B2 | 9/2014 | Lasecki |
| 8,857,607 B2 | 10/2014 | Lasecki et al. |
| 8,857,608 B2 | 10/2014 | Lackner et al. |
| 8,899,409 B2 | 12/2014 | Lasecki |
| 8,985,318 B2 | 3/2015 | Neely |
| 9,061,829 B2 | 6/2015 | Salsone et al. |
| 9,079,719 B2 | 7/2015 | Talsma et al. |
| 9,096,380 B2 | 8/2015 | Lasecki et al. |
| 9,150,359 B2 | 10/2015 | Lasecki et al. |
| 9,377,151 B2 | 6/2016 | Jensen |
| 9,394,109 B2 | 7/2016 | Talsma et al. |
| 9,481,523 B2 | 11/2016 | Talsma et al. |
| 9,527,673 B2 | 12/2016 | Bogle et al. |
| 9,708,126 B2 | 7/2017 | Bogle |
| 9,815,630 B1 | 11/2017 | Coto |
| 9,884,723 B2 | 2/2018 | Neely et al. |
| 10,023,388 B2 | 7/2018 | Talsma et al. |
| 10,189,645 B2 | 1/2019 | Talsma et al. |
| 10,280,004 B2 * | 5/2019 | Perdue ............... B65G 17/086 |
| 10,364,101 B2 | 7/2019 | Neely et al. |
| 10,501,265 B2 | 12/2019 | Talsma et al. |
| 10,730,701 B1 | 8/2020 | Westcott et al. |
| 2006/0249359 A1 | 11/2006 | Pasch |
| 2008/0023304 A1 | 1/2008 | Elsner |
| 2011/0056806 A1 | 3/2011 | Johnson |
| 2012/0006654 A1 | 1/2012 | Talsma |
| 2015/0353285 A1 | 12/2015 | Matsuzaki et al. |
| 2017/0022012 A1 | 1/2017 | Neely et al. |
| 2019/0016535 A1 | 1/2019 | Elsner et al. |

OTHER PUBLICATIONS

Ashworth Bros., Inc., PosiDrive Spiral (TM), Food Engineering Magazine, Oct. 2017, 1 page.

\* cited by examiner

DIRECT EDGE DRIVE CONVEYOR BELT

CROSS-REFERENCE TO RELATED APPLICATIONS

This application is a continuation of U.S. patent application Ser. No. 15/910,446 filed on Mar. 2, 2018, now U.S. Pat. No. 10,280,004 issued on May 7, 2019, which claims priority from U.S. Provisional Application No. 62/466,640 filed on Mar. 3, 2017, all of which are hereby incorporated by reference as if fully set forth herein.

TECHNICAL FIELD

The present disclosure is directed to a conveyor belt system, and more particularly to a direct edge drive conveyor belt system for maintaining belt orientation and providing improved positive edge drive capability.

BACKGROUND OF THE DISCLOSURE

Conveyor systems in which conveyor belts are driven in a helical path with the belt curving edgewise around a series of vertically spaced loops are commonly used to provide a great length of endless conveyor belt in a relatively small space. Such a spiral conveyor system is disclosed, for example, in U.S. Pat. No. 3,348,659, the content of which is hereby incorporated by reference. In such a system, the belt is frictionally driven by driving elements which slidingly engage the radially inner edge of the belt in the helical loops. The driving elements move faster than the inner edge of the belt and continuously slide past the belt edge to achieve a frictional as opposed to a direct or positive drive. This prior system provides smooth dependable operation within its safe operating parameters, relative to speed, loading and belt width. When such parameters are exceeded, however, the belt is subjected to excessively high tension which can result in excessive wear and fatigue failure of the belt in addition to causing damage to the conveyor structure. Further, when the safe parameters are exceeded, surging of the belt can result which interferes with its smooth operation and causes disturbance of the products being conveyed.

Attempts have been made in certain prior art conveyor systems to employ a positive drive in which the radially inner edge of the belt is directly driven by the continued abutting engagement between the driving elements and the belt as opposed to a sliding frictional engagement. To obtain a positive drive, the driving elements must extend past the outer belt surface into the belt structure to engage interior drive surfaces of the belt. In a helical conveyor system, such engagement is difficult to initiate and maintain smoothly. Necessarily as the belt tangentially approaches and moves into its first helical loop, the pitch of the links along its radially inner edge changes as the curvature of the edge changes. Initial engagement of the drive elements with the driven surfaces along the belt edge while their pitch is changing results in rough belt operation and excessive wear of the affected components. Moreover, after the initial engagement, any significant variation in the pitch of the driven surfaces while traversing the helical loops is disadvantageous. Such pitch changes occur with any significant variation in the length of belt in the helical path. If there is an increase in pitch, driving contact can be lost. The belt can thus migrate backwardly along the loops and become slack in its approach to the first loop. If there is a decrease in the pitch, excessive belt tension results which causes various problems including surging, excessive wear, fatigue failure and other damage to the system. Still further, the invasion of the driving elements past the edge of the belt to contact the driven surfaces can result in damage if there is excessive penetration resulting in extraneous engagement with parts of the belt other than the intended driven surfaces.

With reference to FIG. 1, U.S. Pat. No. 4,852,720, the content of which is hereby incorporated by reference, addresses the above concerns by providing a conveyor system comprising a conveyor belt 11 positively driven by drive cage 212 around a plurality of vertically spaced helical loops. A pair of supplemental positive drives 25 and 26, which are driven at the same speed and synchronized with the drive cage, engage the belt 11 near its entry into and exit from the helical portion of its endless path. Vertical driving bars 45 on the drive cage 21 positively engage the cross rod heads 14 of the belt 11 in its helical path. The driving surfaces of the bars 45 are relieved at 61 and 62 to prevent driving engagement with the rod heads 14 over an inlet section of the first loop and an exit section of the last loop. The driving bars 45 also engage the ends of the rod heads 14 to limit the penetration of the driving bars past the edge of the belt. The driving bars include means which may comprise gates 105 or ramps 121 to permit controlled intermittent slip-backs of the rod heads at predetermined intervals.

While successful, there still exists a need in the marketplace for a conveyor system for maintaining belt orientation, providing improved positive edge drive capability, and permitting smooth engagement of the driving bars with the belt edge as the belt enters the first loop at one end of the helical portion and smooth disengagement of the bars from the belt edge as the belt leaves the last loop at the opposite end of the helical portion.

SUMMARY

A conveyor belt according to one aspect of the disclosure comprises a plurality of spaced tractive rods including opposing inner and outer ends; and a support surface transversely disposed with respect to a direction of travel and interconnecting said plurality of spaced tractive rods; wherein at least one of the inner and outer ends of at least some of the plurality of spaced tractive rods includes a cone shaped end portion.

According to a further aspect of the conveyor belt the at least one of the inner and outer ends having the cone shaped end portion includes both the inner end and the outer end.

According to a still further aspect of the conveyor belt, the at least one of the inner and outer ends having the cone shaped end portion includes only the inner end having the cone shaped end portion, and the outer end includes a button head welded end.

BRIEF DESCRIPTION OF THE DRAWING FIGURES

These and other objects, features, and advantages of the invention will become more readily apparent to those skilled in the art upon reading the following detailed description, in conjunction with the appended drawings in which.

Figure 1:
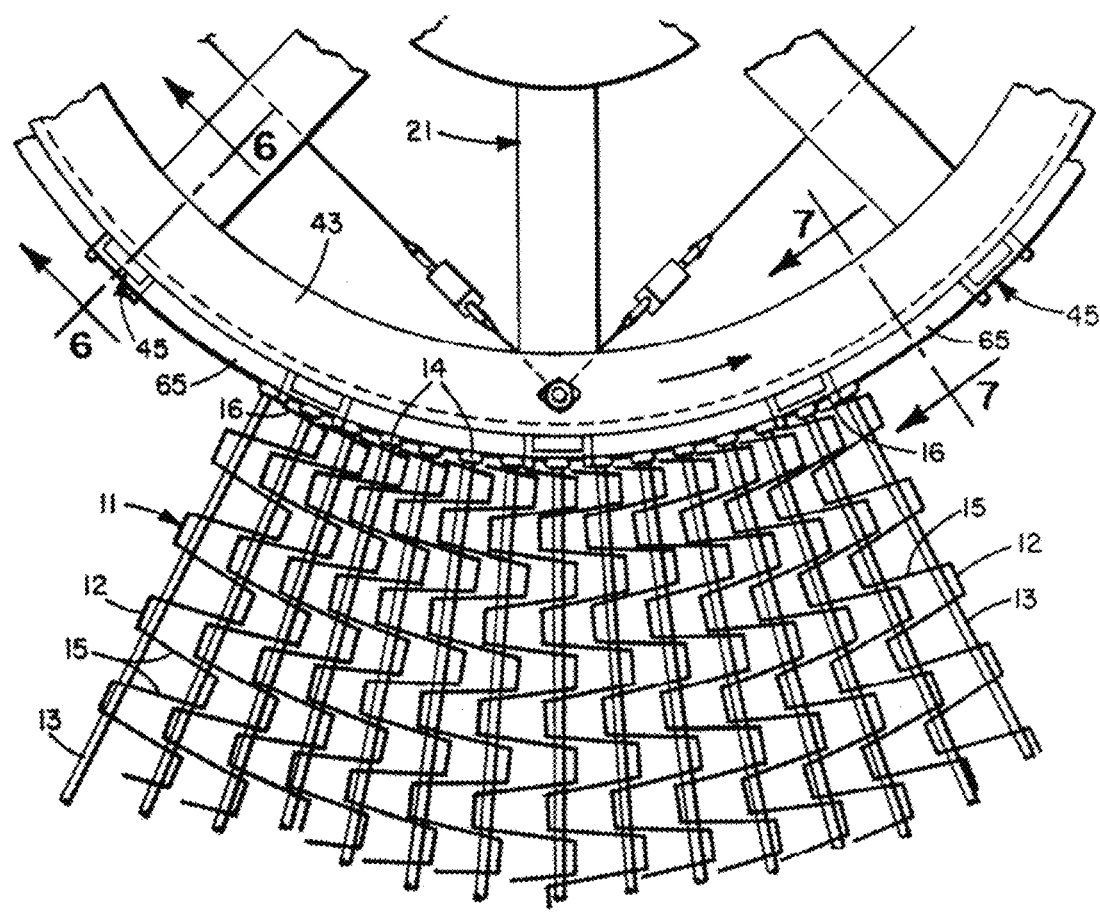
FIG. 1 is a fragmentary plan view of a portion of a known conveyor belt being driven in one of the helical loops by the driving cage.
Figure 2:
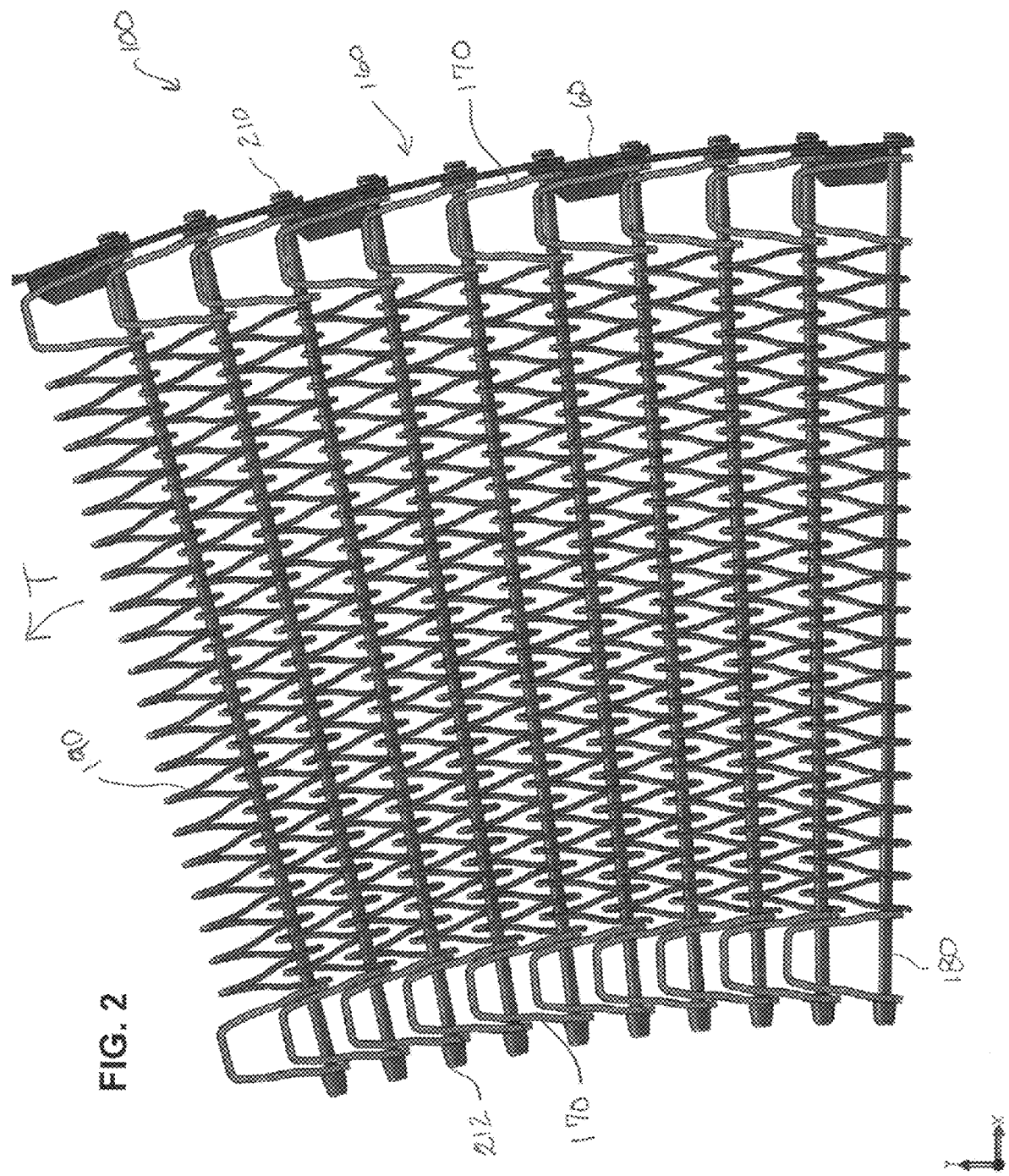
FIG. 2 is a top elevational view of a portion of a conveyor belt according to a first exemplary embodiment of the disclosure in a curved path.
Figure 3:
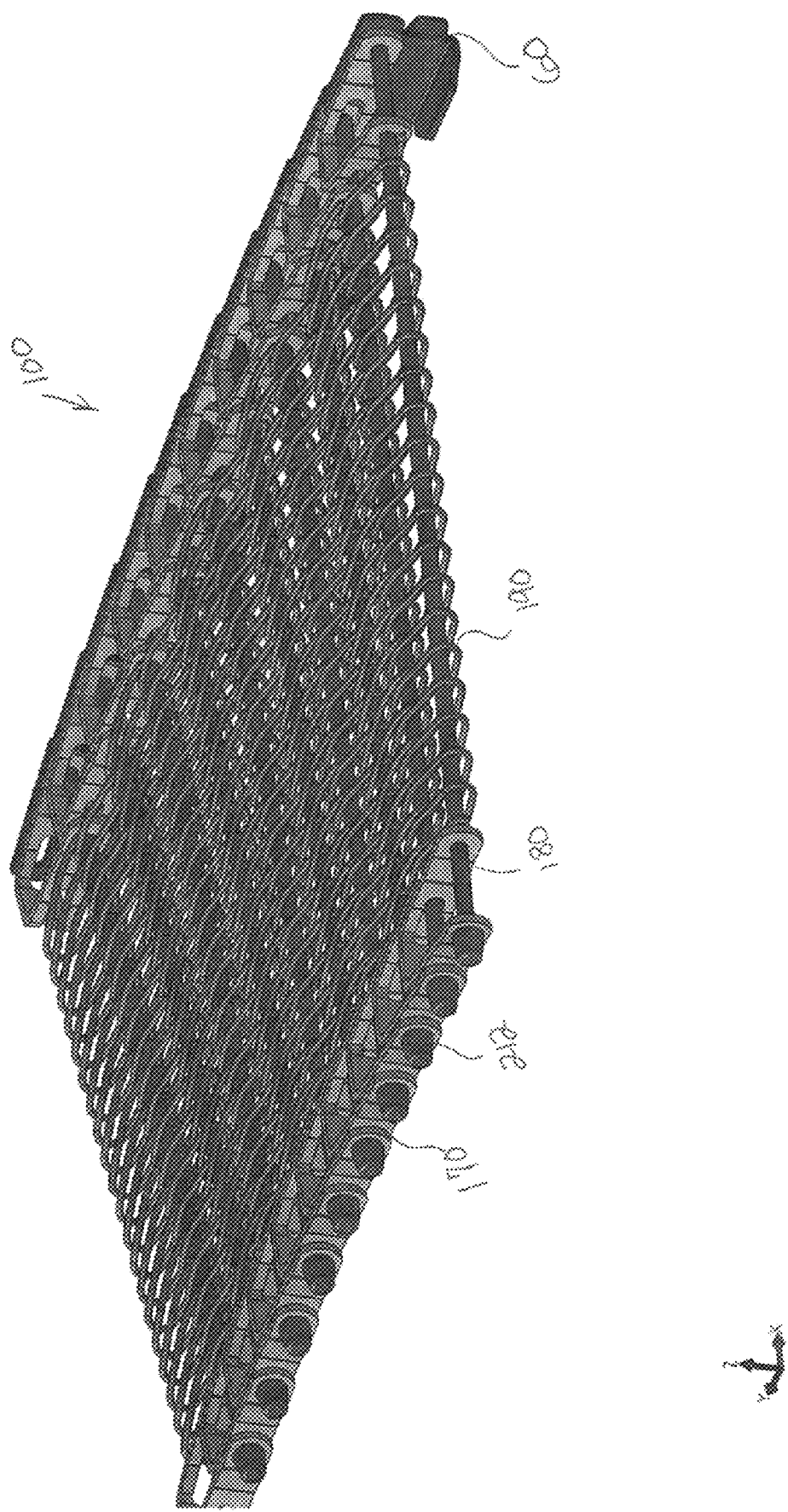
FIG. 3 is a left perspective view thereof.
Figure 4:
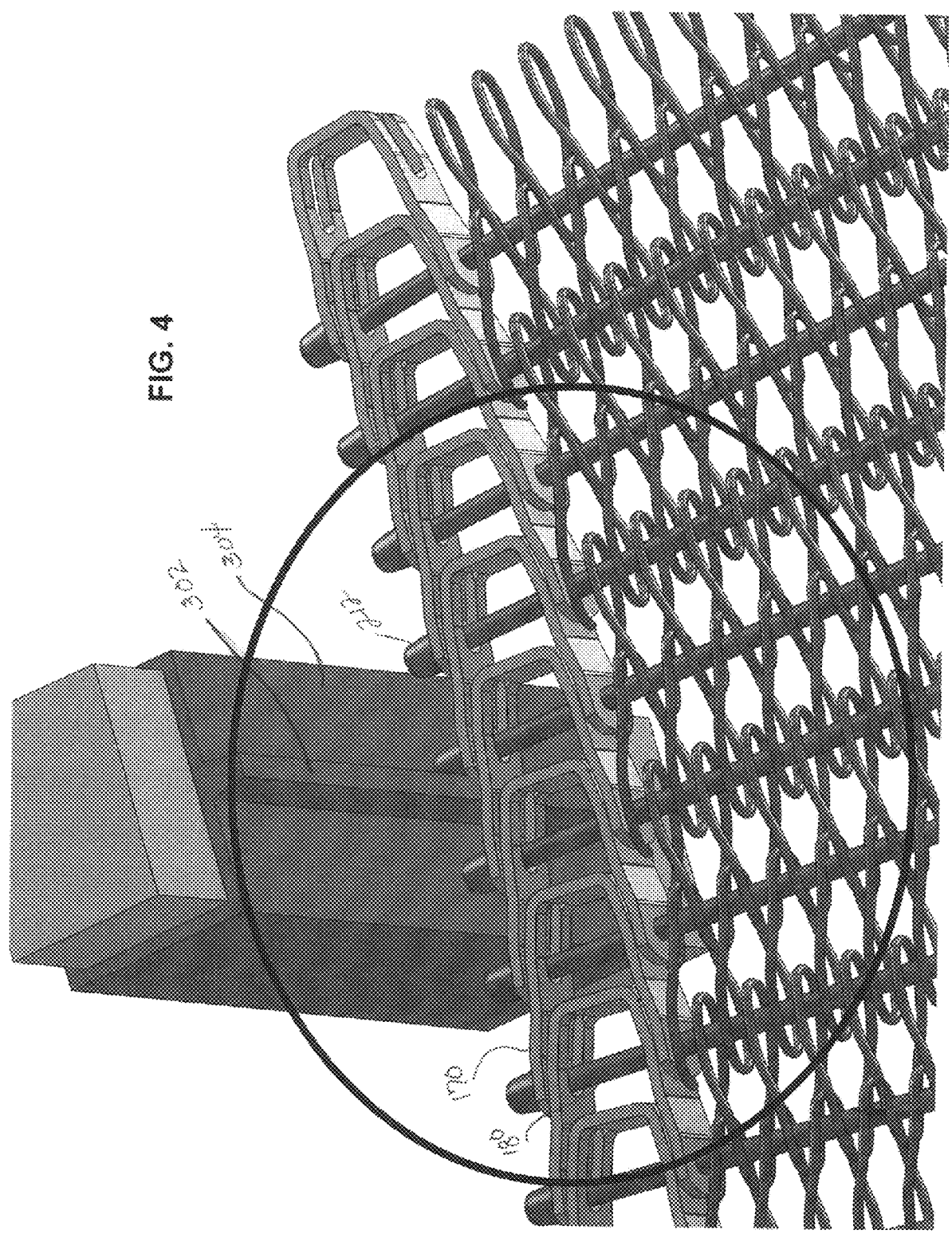
FIG. 4 is a partial enlarged perspective view thereof (denoted by the circle outline) illustrating engagement of the conveyor belt with a spiral cage.
Figure 5:
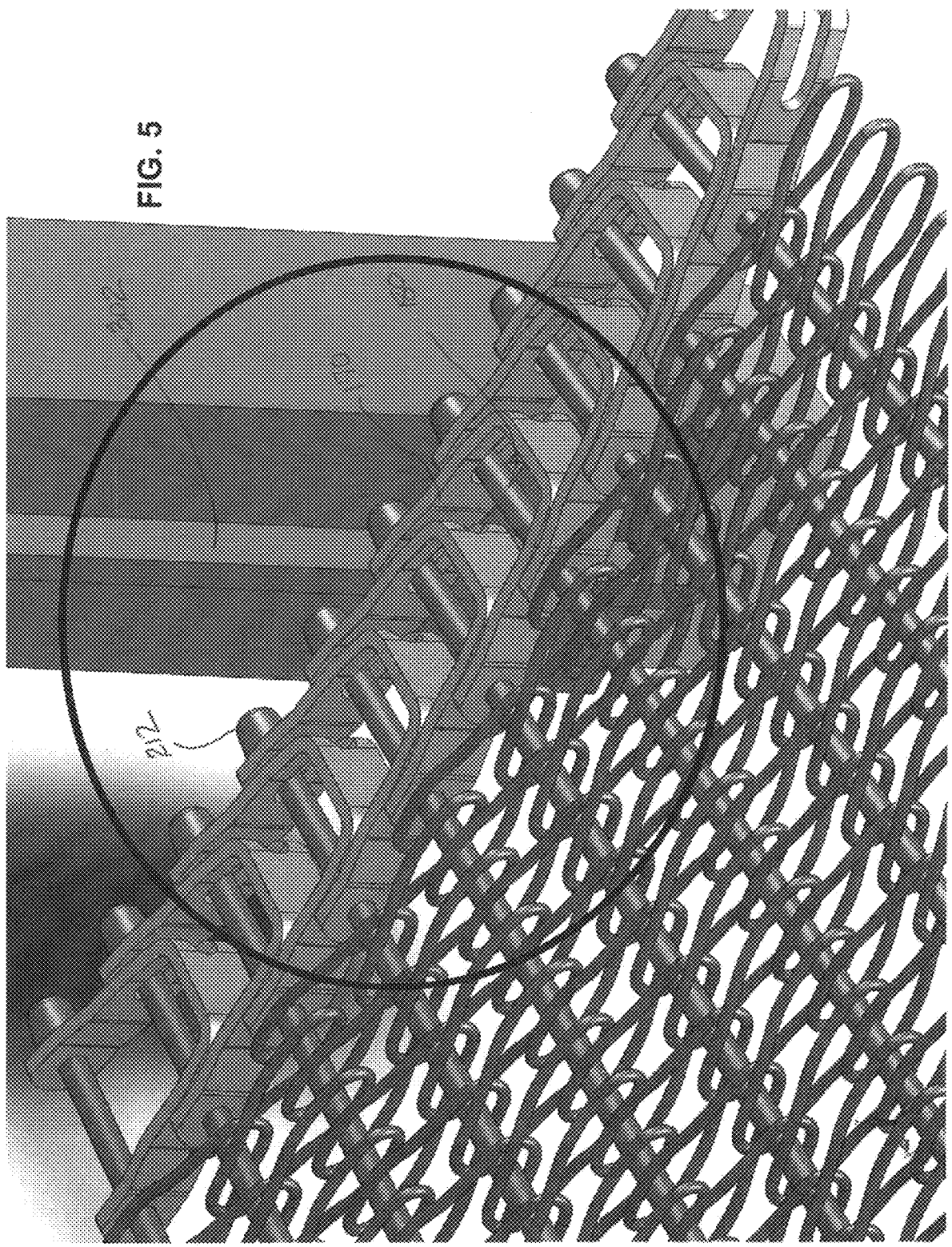
FIG. 5 is a further partial enlarged perspective view thereof (denoted by the circle outline) illustrating engagement of the conveyor belt with the spiral cage.
Figure 6:
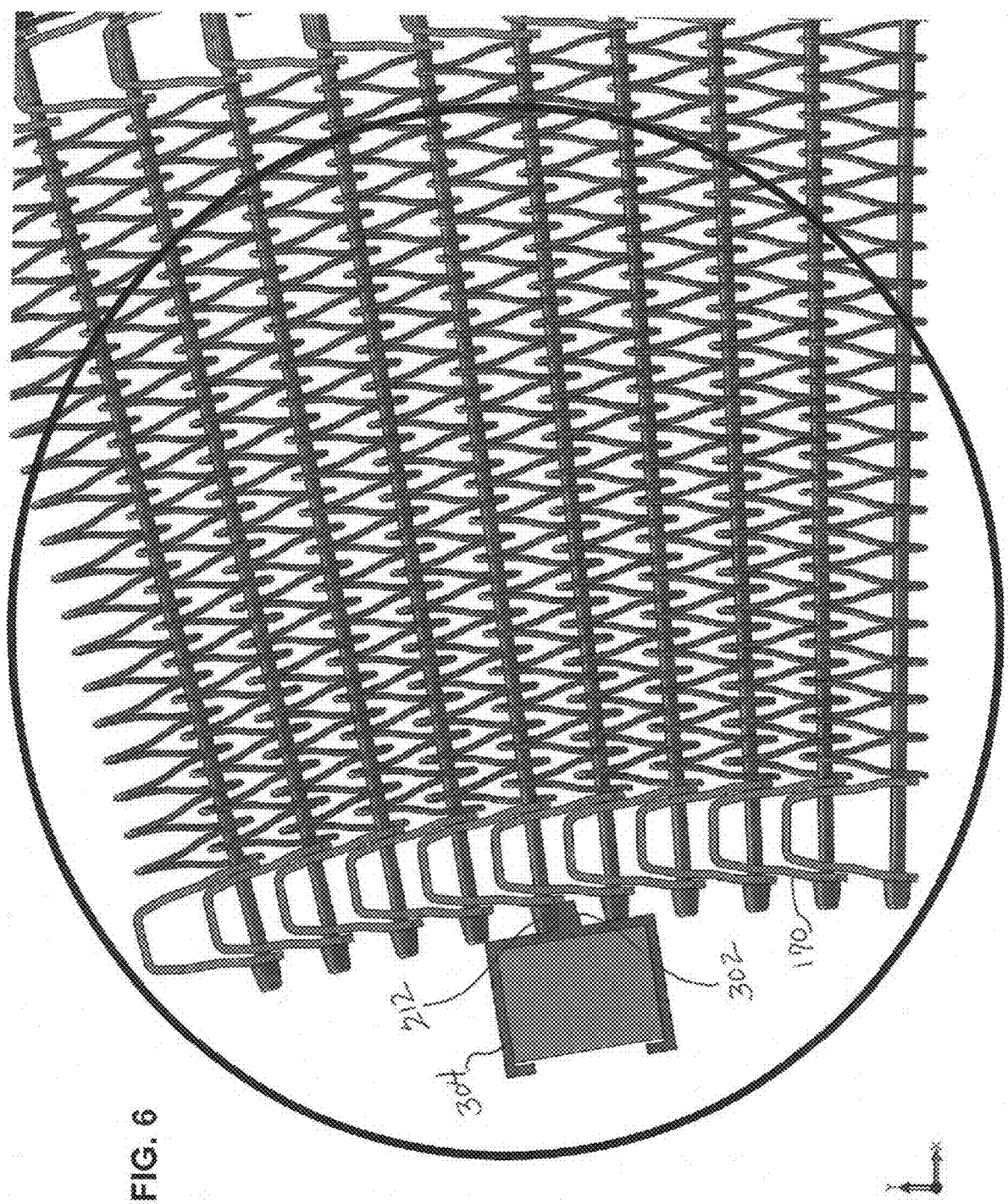
FIG. 6 is a partial top elevational view thereof (denoted by the circle outline) illustrating engagement of the conveyor belt with the spiral cage.
Figure 7:
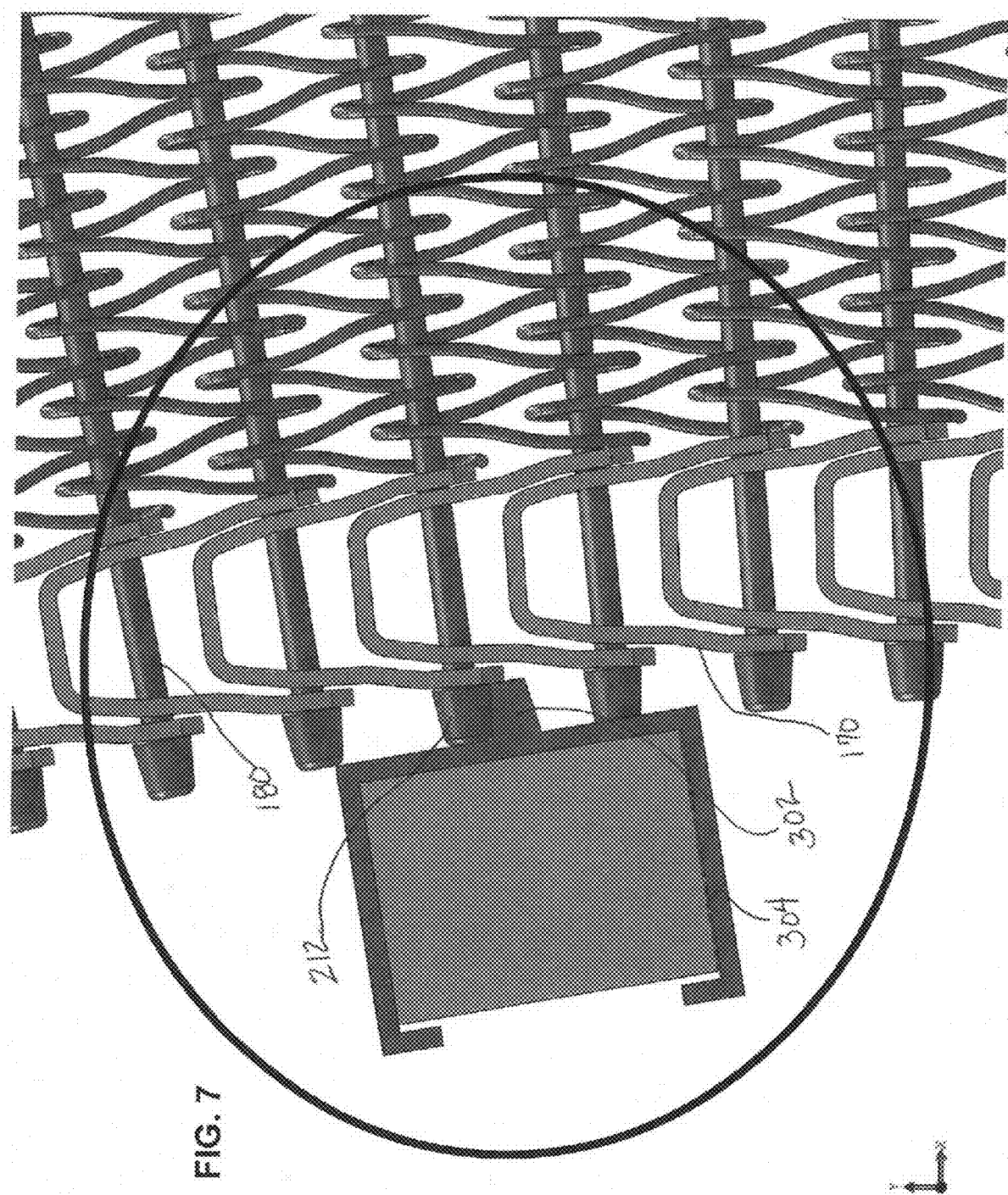
FIG. 7 is a partial enlarged view of FIG. 6 (denoted by the circle outline), illustrating engagement of the conveyor belt with the spiral cage.
Figure 8:
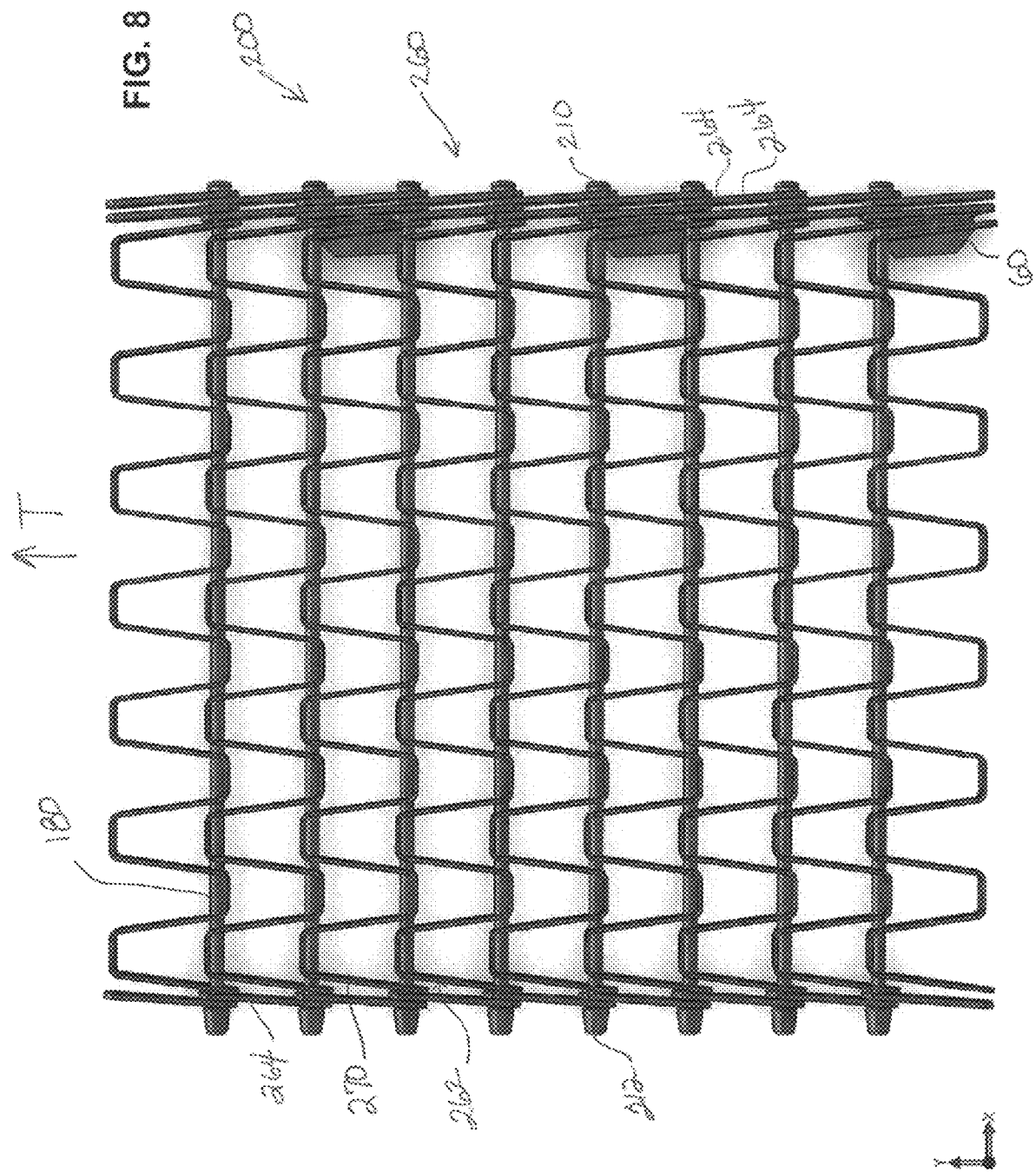
FIG. 8 is a top elevational view of a conveyor belt according to a further exemplary embodiment of the disclosure in a straight path.
Figure 9:
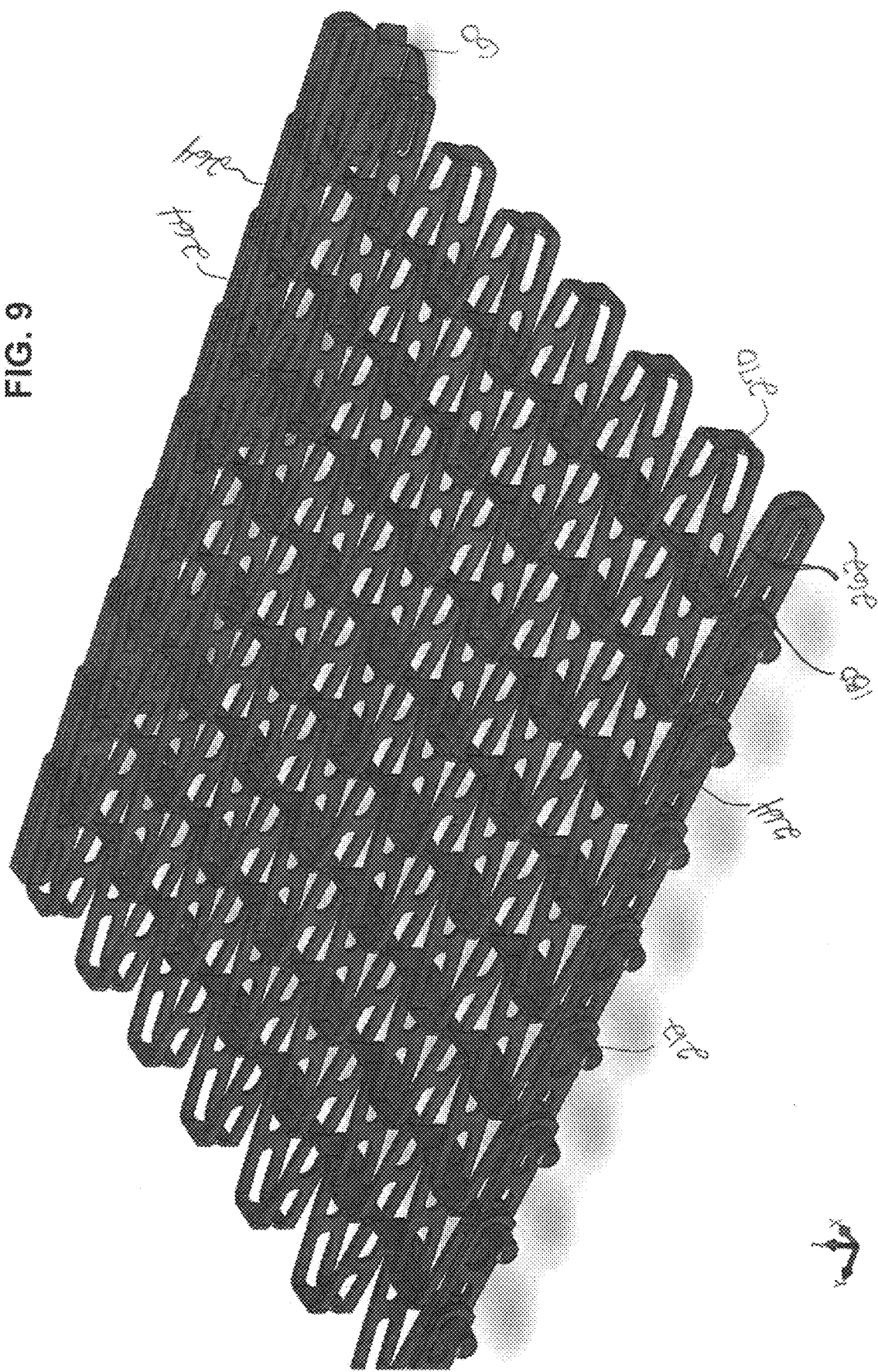
FIG. 9 is a left perspective view thereof.
Figure 10:
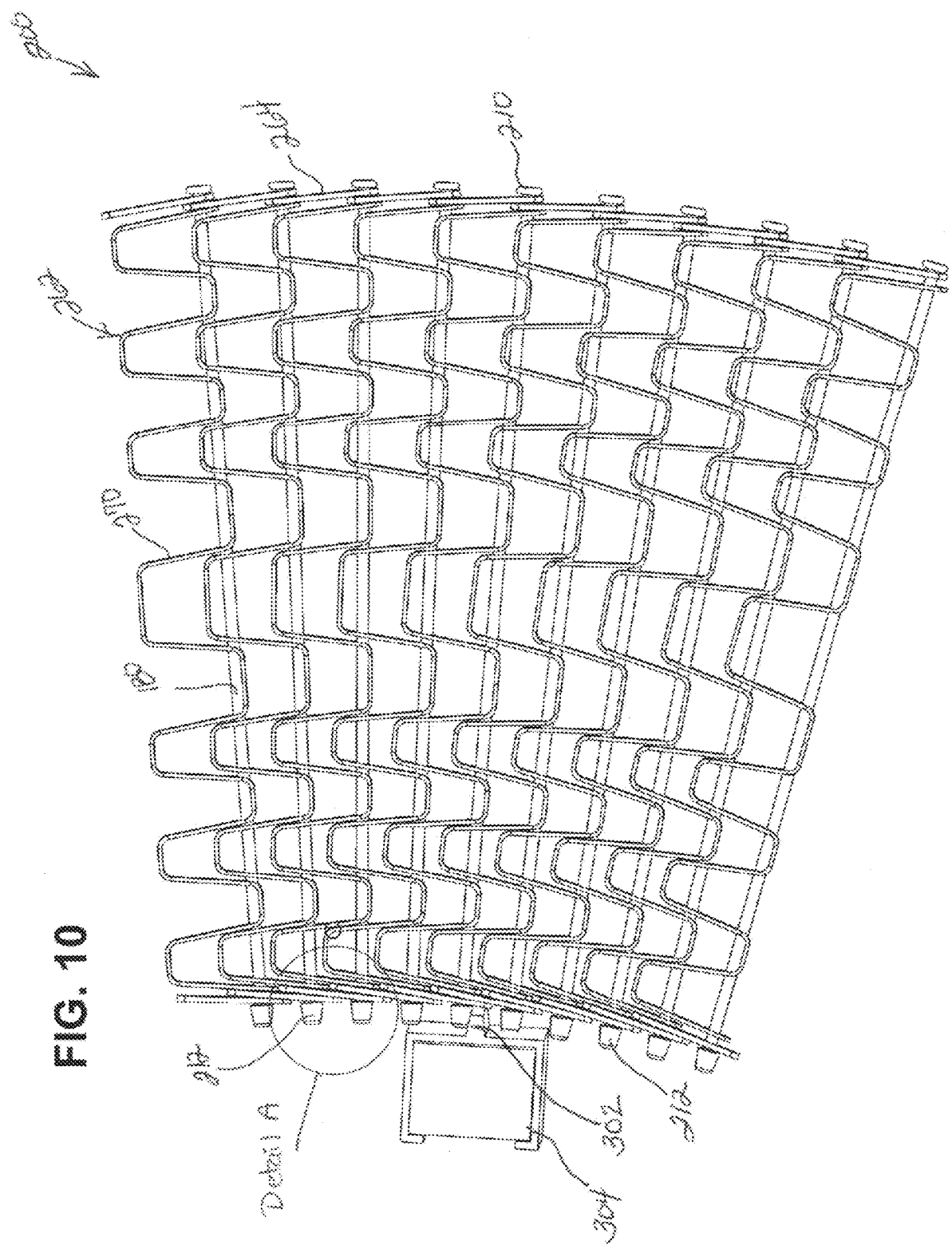
FIG. 10 is a top elevational view thereof illustrating engagement of the conveyor belt with the spiral cage.
Figure 11:
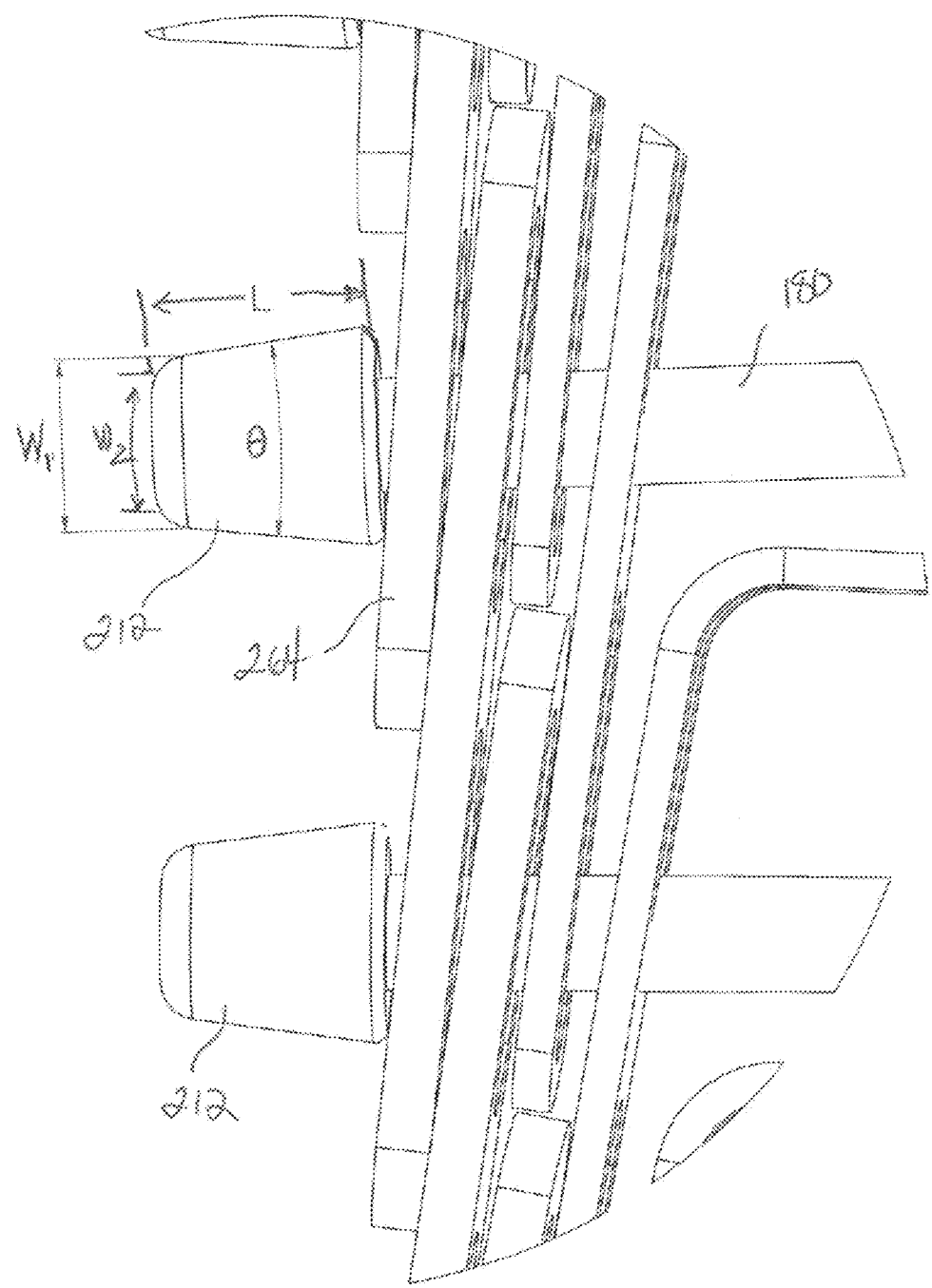

FIG. 11 in an enlarged view of Detail A shown in FIG. 10.

Figure 12:
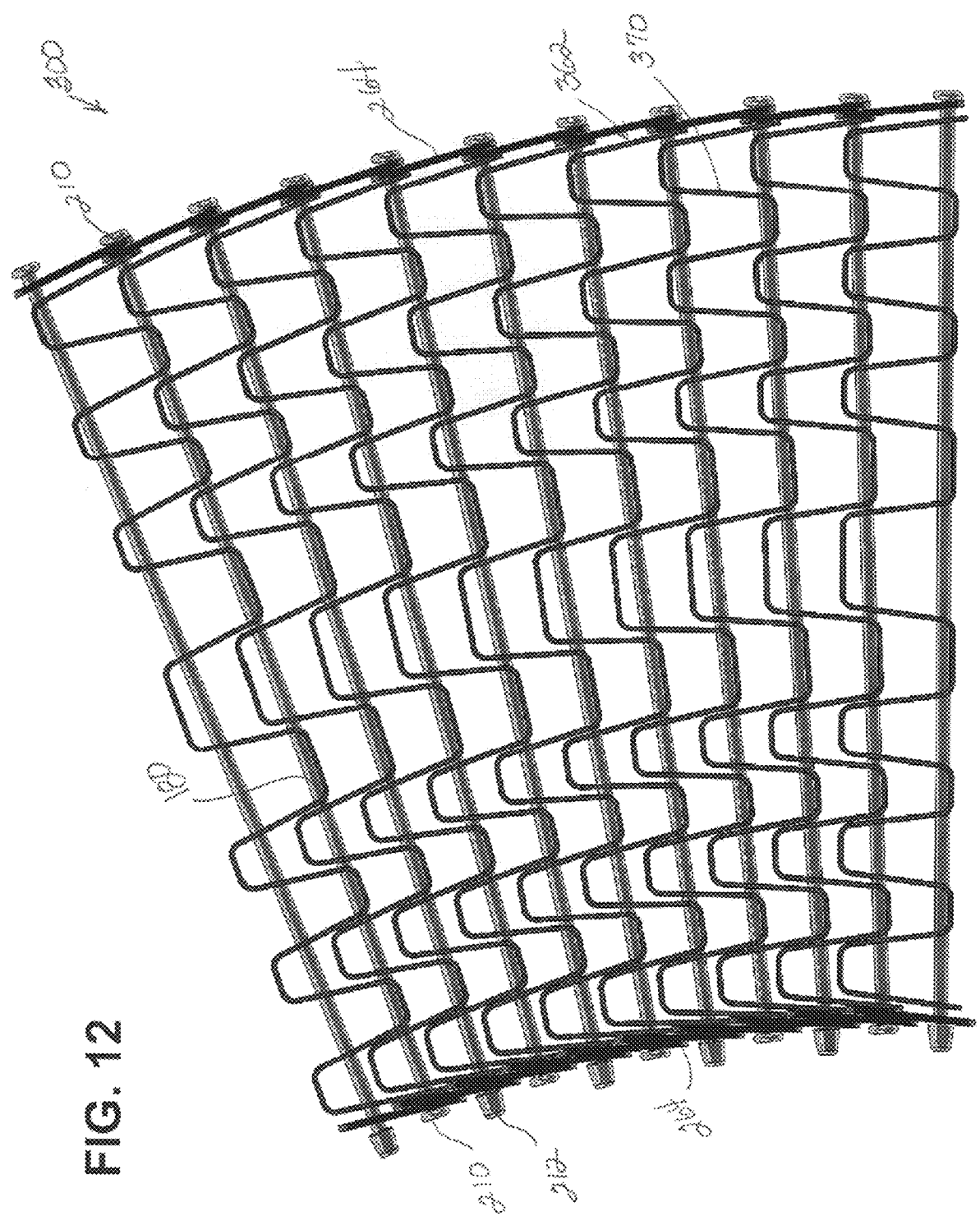

FIG. 12 is a top elevational view of a conveyor belt according to a further exemplary embodiment of the disclosure in a curved path.

Figure 13:
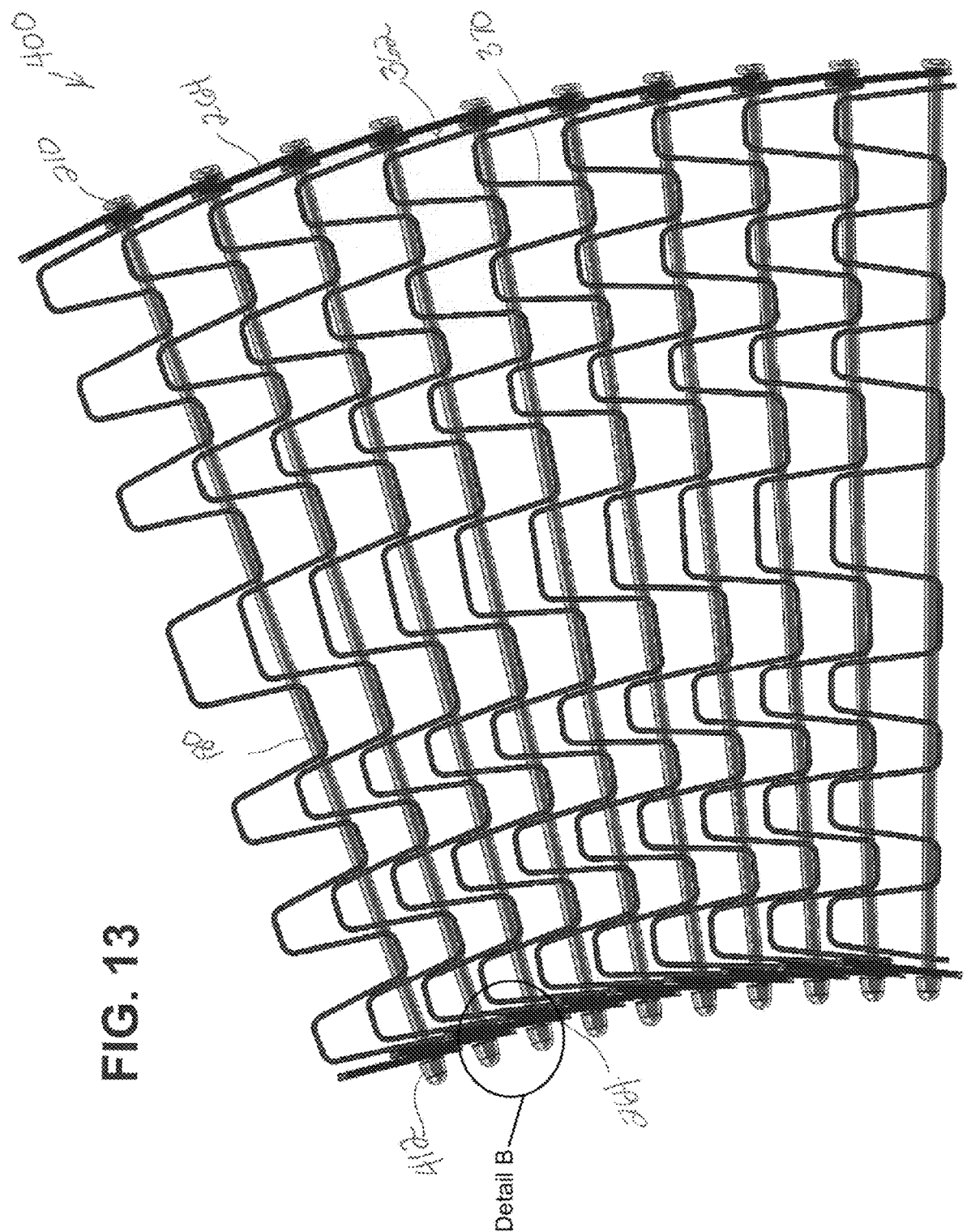

FIG. 13 is a top elevational view of a conveyor belt according to a further exemplary embodiment of the disclosure in a curved path.

Figure 14:
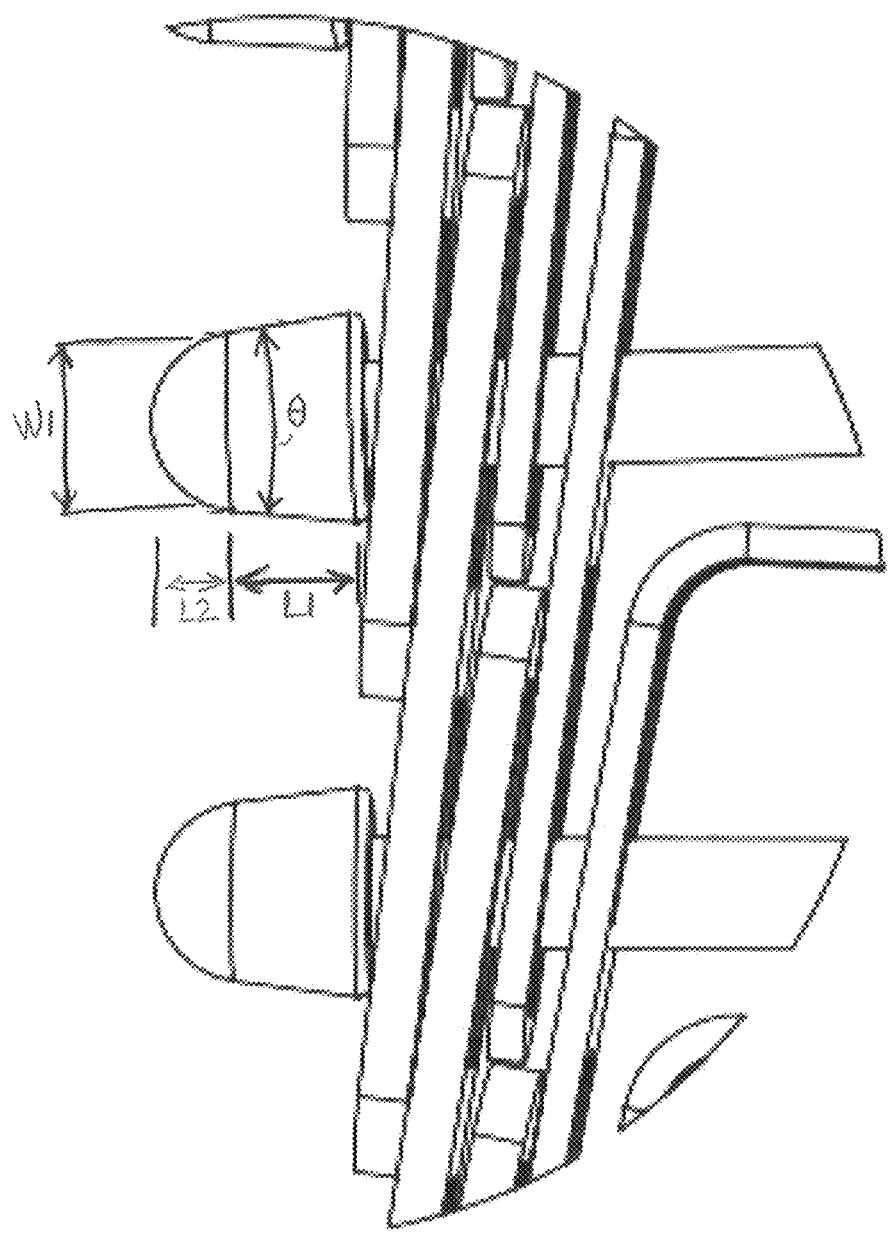

FIG. 14 is an enlarged view of Detail B shown in FIG. 13.

Figure 15:
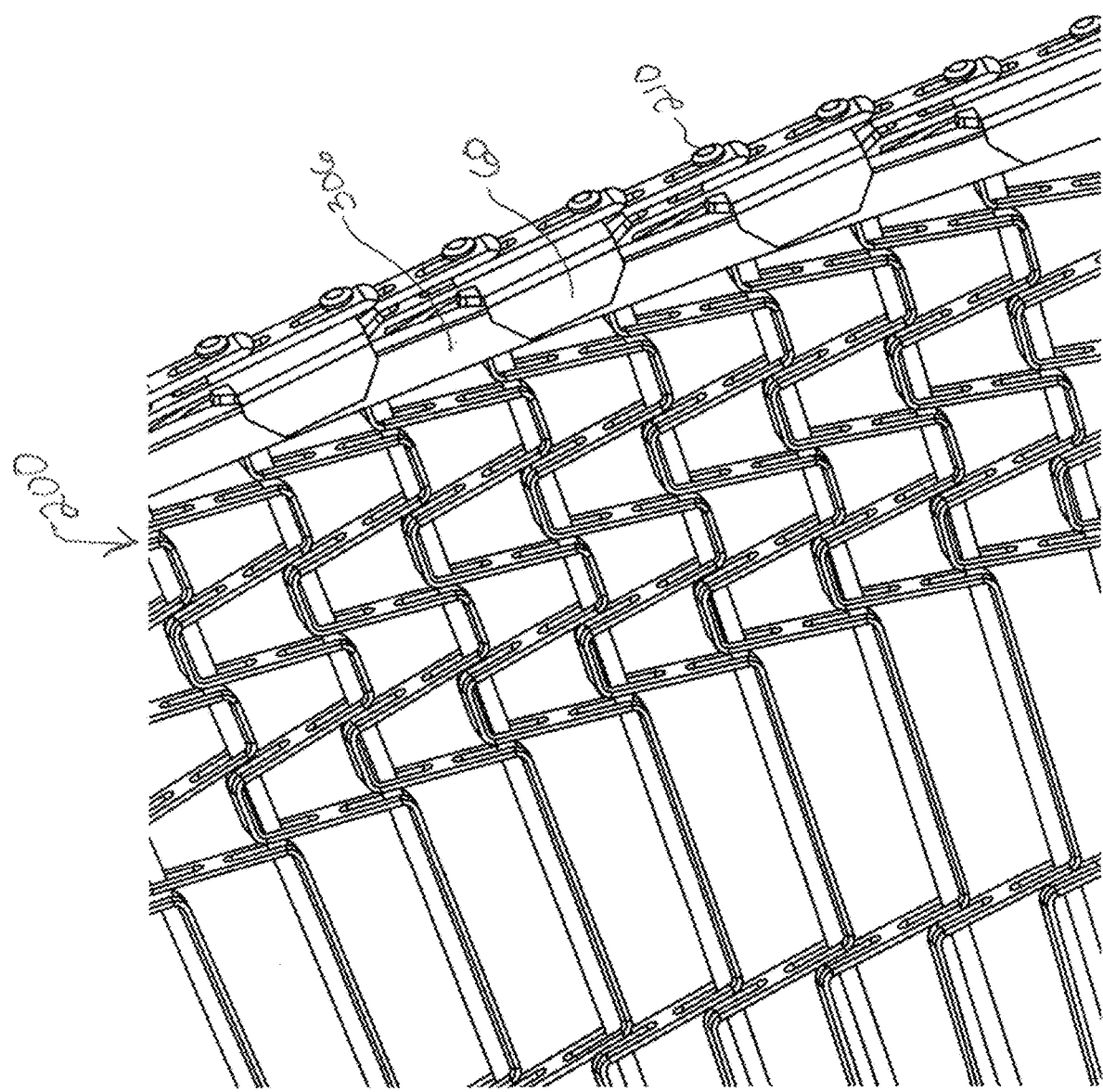

FIG. 15 is a partial bottom perspective view illustrating a hold-down clip engagement with a rail at either the approach portion or exit portion of the conveyor system.

DETAILED DESCRIPTION

A direct edge drive conveyor belt will be described below by reference to the embodiments disclosed herein as examples and in accordance with the attached drawings. For purposes of illustration, the drawings include enlarged fragmentary portions of a conveyor belt as best shown within the annotated circle superimposed thereon in some of the figures. In the following descriptions of the various embodiments disclosed herein, it is understood that like reference numerals are used to describe the same elements throughout.

Referring to FIGS. 2-7, a conveyor belt in accordance with a first exemplary embodiment of the disclosure is shown generally by reference numeral 100. Conveyor belt 100 is preferably a mesh overlay conveyor belt, although other belt types and configurations could of course be used. Conveyor belt 100 includes a plurality of spaced tractive rods 180 disposed in succession and transversely with respect to a direction of travel of belt 100 as represented by arrow T.

Belt 100 includes a plurality of support rows 160 transversely disposed with respect to the direction of travel T, and interconnecting the succession of rods 180. Each row 160 is comprised of a plurality of U-shaped links 170, each link connecting a rod 180 with a following rod in the succession. More preferably, each row 160 includes at least one link 170 on each end and a mesh overlay 190 extending therebetween. In addition, belt 100 preferably includes one or more rows including a hold-down clip 60 disposed along at least one edge of the conveyor belt which is intended to engage a rail on the conveyor. Hold-down clips 60 could also be positioned along both edges of the conveyor belt depending on the desired construction and function of the particular belt. Hold-down clips 60 are disclosed in U.S. Pat. No. 9,061,829 to the present assignee, the entire contents of which is hereby incorporated by reference, and a detailed description thereof is thus omitted herein. Still further, it is within the scope of the present disclosure that conveyor belt 100 may also include belt drive clips (not shown) and reinforcing bars (not shown) or, alternatively, any combination of hold-down clips, belt drive clips and reinforcing bars. Thus, it should be apparent to one skilled in the art, that in accordance with the disclosure herein any combination of belt drive clips, hold-down clips and/or reinforcing bars may be used depending upon the particular application for which the conveyor belt is intended.

The combination of hold-down clips 60 on the outer edge of the conveyor belt with a welded U-shaped link 170 and rod 180 assembly provides support for the position of the metal mesh overlay 190. The rows of hold-down clips 60 along the outer, tension-bearing belt edge provide superior strength to offset the belt tension that results during system operation. The hold-down clips 60 are also used to position the belt properly for engagement with the spiral drum, as discussed further below.

Each connecting rod 180 has two ends, one end preferably terminating in a conventional button head 210 and the other end terminating in a truncated cone 212. The cone end 212 is a modification of the conventional welded button head that creates an extension on the inside edge of the belt 100 so that it can positively engage the vertical drive lugs 302 on a rotating spiral cage 304. The truncated conical shape on the rod end 212 allows for smoother engagement and disengagement with spiral drive means, such as the vertical drive lugs 302 on the rotating spiral cage 304, without the concern for orientation and the cone ends 212 provide a smooth face for contact with the drive lugs 302 at any point of travel along the belt when in contact with the vertical drive lugs 302. Referring also to FIG. 15, the rail 306 of the conveyor system should preferably be constructed with a gradually decreasing radius of curvature such that, when used with the hold-down links 60 on the outer edge of the belt 100, it prevents the inside edge of the belt 100 from contacting the drive lugs 302 on the rotating spiral cage 304 until the proper position of the belt has been reached and engagement can occur. That is, the rail 306 preferably includes an approach portion leading into a first loop at one end of the helical portion of the conveyor system and an exit portion leading away from a last loop at the other end of the helical portion of the conveyor system. The radius of the rail 306 at the approach portion is configured such that the hold-down clips 60 hold the conveyor belt 100 away from the rotating spiral drive means and then gradually bring the belt 100 closer and into contact with the first drive lug 302 so that the cone shaped end 212 can smoothly engage the drive lug 302. Similarly, upon exiting the helical portion of the conveyor system, the radius of the rail 306 is configured to allow for smooth disengagement between the drive lugs 302 and the cone shaped ends 212.

Referring to FIGS. 8-11, a conveyor belt in accordance with a second exemplary embodiment of the disclosure is shown generally by reference numeral 200. Conveyor belt 200 is preferably a flat wire conveyor belt, although other belt types and configurations could of course be used. Conveyor belt 200 includes a plurality of spaced tractive rods 180 disposed in succession and transversely with respect to a direction of travel of belt 200 as represented by arrow T.

Belt 200 includes a plurality of support rows 260 transversely disposed with respect to the direction of travel T, and interconnecting the succession of rods 180. Each row 260 is comprised of a wicket 262 comprising a plurality of U-shaped links 270 connecting a rod 180 with a following rod in the succession. Conveyor belt 200 also may include one or more rows of reinforcing bars 264 along one or both edges. In the illustrated embodiment of FIGS. 8 and 9, conveyor belt 200 includes one row of reinforcing bars 264 on the inner edge and two rows of reinforcing bars 264 on the outer edge, whereas in FIG. 10 there are two rows of reinforcing bars 264 on the inner edge and single row of bars 264 on the outer edge. In addition, belt 200 preferably includes one or more rows including a hold-down clip 60 disposed along at least one edge of the conveyor belt which is intended to engage a rail on the conveyor. Hold-down clips 60 could also be positioned along both edges of the conveyor belt depending on the desired construction and function of the particular belt. Hold-down clips 60 are disclosed in U.S. Pat. No. 9,061,829 to the present assignee, the entire contents of which is hereby incorporated by reference, and a detailed description thereof is thus omitted herein. Still further, it is within the scope of the present disclosure that conveyor belt 200 may also include belt drive clips (not shown) and reinforcing bars (not shown) or, alternatively, any combination of hold-down clips, belt drive clips and reinforcing bars. Thus, it should be apparent to one skilled in the art, that in accordance with the disclosure herein any combination of belt drive clips, hold-down clips and/or reinforcing bars may be used depending upon the particular application for which the conveyor belt is intended.

Each connecting rod 180 has two ends, one end preferably terminating in a conventional button head 210 and the other end terminating in a truncated cone 212. The cone end 212 is a modification of the conventional welded button head that creates an extension on the inside edge of the belt 200 so that it can positively engage the vertical drive lugs 302 on a rotating spiral cage 304. The truncated conical shape on the rod end 212 allows for smoother engagement and disengagement with the vertical drive lugs 302 on the rotating spiral cage 304 without the concern for orientation. The cone ends 212 also provide a smooth face for contact with the drive lugs 302 at any point of travel along the belt when in contact with the vertical drive lugs 302. The rail of the conveyor (not shown) should preferably be constructed with a gradually decreasing radius of curvature such that when used with the hold-down links 60 on the belt 200 it prevents the inside edge of the belt 200 from contacting the drive lugs on the rotating spiral cage until the proper position of the belt has been reached and engagement can occur.

FIG. 11 illustrates an enlarged view of an exemplary embodiment of the cone end 212 of the connecting rod 180. Preferably, the truncated conical ends 212 have an overall length L (in the axial direction of the connecting rod 180) of approximately 0.25 inch to 0.5 inch, preferably 0.375 inch. The ends 212 have tapered side surfaces defining an angle θ from the horizontal of approximately 15 degrees. At the base of the cone end 212 adjacent the reinforcing bar 264, the diameter of the cone end 212 is approximately 0.36 inch. At the distal end of the frustoconical body portion, the cone end 212 has a width W1 (diameter) of approximately 0.3 inch. The cone end 212 has rounded distal edges and, at the terminal end of the cone 212, a substantially planar end surface defining a width W2 (diameter) of approximately 0.17 inch is defined. Although FIG. 11 is shown as an enlarged detail of conveyor belt 200 shown in FIGS. 8-10, one skilled in the art will understand that the cone end 212 shown in FIG. 11 also corresponds to the cone end 212 illustrated in the first exemplary embodiment of FIGS. 2-7, and the cone end 212 of the further embodiment shown in FIG. 12 and discussed below.

A conveyor belt in accordance with a further exemplary embodiment is shown generally in FIG. 12 by reference numeral 300. Conveyor belt 300 preferably comprises a flat wire conveyor belt as described above relative to conveyor belt 200, although other belt types and configurations could of course be used. Conveyor belt 300 differs from the previously described conveyor belt 200 primarily in that the cone ends 212 are only provided on the inner edge of every other connecting rod 180 rather than each connecting rod 180. More particularly, a first connecting rod 180 will have a button head end 210 on both the inner and outer edges and an adjacent connecting rod 180 will have a button head end 210 on the outer edge and a cone end 212 on the inner edge. Although not pertinent to the disclosure herein, conveyor belt 300 also differs from the previously described flat wire belt 200 in that wicket 362 includes a plurality of variably spaced U-shaped links 370 and only a single reinforcing bar 264 is shown on the inner and outer edges.

A conveyor belt in accordance with a further exemplary embodiment is shown generally in FIGS. 13 and 14 by reference numeral 400. Conveyor belt 400 preferably comprises a flat wire conveyor belt as described above relative to conveyor belt 300, although other belt types and configurations could of course be used. Conveyor belt 400 differs from the previously described conveyor belt 300 primarily in the shape of the cone ends 412, which are illustrated as being provided on the inner edge of each connecting rod 180 but could be provided on the inner edge of every other connecting rod 180 instead. Preferably, the frustoconical body portion of the conical end 412 has a length L1 (in the axial direction of the connecting rod 180) of approximately 0.18 inch to 0.25 inch, preferably 0.22 inch. Conical ends 412 have rounded terminal ends that extend the overall length by an additional length L2 of 0.16 inch. The ends 412 have tapered side surfaces defining an angle θ from the horizontal of approximately 15 degrees. At the base of the cone end 412 adjacent the reinforcing bar 264, the diameter of the cone end 412 is approximately 0.36 inch. At the distal end of the frustoconical body portion, prior to the rounded terminal end, the cone end 412 has a width W1 (diameter) of approximately 0.32 inch.

The conveyor belt according to any one of the exemplary embodiments described above is configured for use in a spiral or helical conveying system and, in particular, a conveying system including a drive means such as a spiral drum or cage which has driving surfaces, lugs or vertical bars configured to engage the cone shaped end portions 212, 412 in direct driving relationship. A rail is provided in such a system for supporting the belt as it travels through an endless path including a helical portion extending through a plurality of vertically spaced loops with the belt curved laterally in each of the loops. The rail includes an approach portion leading into a first loop at one end of the helical portion and an exit portion leading away from a last loop at the other end of the helical portion. With reference to FIG. 15, the radius of the rail 306 at the approach portion is preferably configured such that the hold-down clips 60 hold the conveyor belt away from the rotating spiral drive means and then gradually bring the belt closer and into contact with the first driving surface so that the cone shaped end 212, 412 can smoothly engage the driving surface. Similarly, upon exiting the helical portion of the conveyor system, the radius of the rail 306 is configured to allow for smooth disengagement between the driving surface and the cone shaped ends 212, 412.

While the use of the various embodiments of the cone ends are described as being on every inner edge or every other inner edge of the conveyor belt, it is within the scope of the disclosure that even less frequency thereof could be applied to the conveyor belt. That is, the conveyor belt may include cone ends on only every third or fourth inner edge of the connecting rod. Still further, the belt may be manufactured without any reinforcing bars or alternatively, several rows of reinforcing bars may be provided, depending upon the particular application. Thus, it should be apparent to one skilled in the art, that any combination of coned ends and/or reinforcing bars may be used depending upon the particular application for which the conveyor belt is intended.

While the disclosure herein has been described with respect to particular exemplary embodiments, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

What is claimed is:

1. A conveyor belt comprising:
    a plurality of spaced tractive rods including opposing inner and outer ends; and
    a support surface transversely disposed with respect to a direction of travel and interconnecting said plurality of spaced tractive rods;
    wherein at least one of the inner and outer ends of at least some of the plurality of spaced tractive rods includes a cone shaped end portion extending along a respective rod axis of the at least some of the plurality of spaced tractive rods, the cone shaped end portion comprises:
        a frustoconical body portion defining a tapered side surface and extending a first axial length along the respective rod axis from a base end to a distal end; and
        a rounded terminal end extending from the distal end of the frustoconical body portion a second axial length along the respective rod axis.

2. The conveyor belt according to claim 1, wherein the at least one of the inner and outer ends includes the inner end and the outer end.

3. The conveyor belt according to claim 1, wherein the at least one of the inner and outer ends includes the inner end including the cone shaped end portion, the outer end including a button head welded end.

4. The conveyor belt according to claim 1, wherein the at least some of the plurality of spaced tractive rods includes every other one of the plurality of spaced tractive rods.

5. The conveyor belt according to claim 1, wherein the tapered side surface defines an angle from the respective rod axis of approximately 15 degrees.

6. The conveyor belt according to claim 1, wherein a predetermined length of the cone shaped end portion along the respective rod axis is approximately 0.25 inch to 0.5 inch.

7. The conveyor belt of claim 1, wherein a ratio of the first axial length to the second axial length is greater than one.

8. The conveyor belt according to claim 1, wherein the support surface comprises a plurality of rows comprising a U-shaped link on an edge of each row.

9. The conveyor belt according to claim 8, wherein the support surface further comprises a mesh overlay extending between the U-shaped links.

10. The conveyor belt according to claim 8, wherein at least some of the rows include a hold-down clip.

11. The conveyor belt according to claim 1, wherein the support surface comprises a plurality of rows including a flat wire wicket.

12. The conveyor belt of claim 1, wherein:
    the base of the frustoconical body portion defines a base diameter; and
    a ratio of the base diameter to the second axial length is greater than two.

13. The conveyor belt of claim 1, wherein:
    the distal end of the frustoconical body portion defines a distal end diameter;
    the base of the frustoconical body portion defines a base diameter; and
    a ratio of the distal end diameter to the base diameter is less than one.

14. The conveyor belt of claim 1, wherein:
    the distal end of the frustoconical body portion defines a distal end diameter; and
    a ratio of the sum of the first axial length and the second axial length to the distal end diameter is greater than one.

15. The conveyor belt of claim 1, wherein a radius of curvature of the rounded terminal end is substantially equal to the second axial length.

16. A conveyor system comprising:
    a conveyor belt comprising a plurality of spaced tractive rods including opposing inner and outer ends; and a support surface transversely disposed with respect to a direction of travel and interconnecting said plurality of spaced tractive rods; wherein at least the inner end of at least some of the plurality of spaced tractive rods includes a cone shaped end portion; and wherein at least the outer end of at least some of the plurality of spaced tractive rods include a hold-down clip;
    drive means having driving surfaces configured to engage said cone shaped end portions in direct driving relationship; and
    a rail for supporting said belt for passage through an endless path including a helical portion extending through a plurality of vertically spaced loops with the belt curved laterally in each of said loops, an approach portion leading into a first loop at one end of said helical portion;
    wherein said hold-down clips engage said rail at an outer edge of the conveyor belt to thereby hold an inner edge of the conveyor belt away from the drive means, said rail being configured with a predetermined radius of curvature to gradually bring the belt into engagement with the driving surfaces at the approach portion.

17. The conveyor system according to claim 16, wherein the cone shaped end portion comprises a frustoconical body portion.

18. The conveyor system according to claim 17, wherein the cone shaped end portion further includes a substantially planar end surface.

19. The conveyor system according to claim 17, wherein the cone shaped end portion further includes a rounded distal end portion.

20. A conveyor system comprising:
    a conveyor belt comprising a plurality of spaced tractive rods including opposing inner and outer ends; and a support surface transversely disposed with respect to a direction of travel and interconnecting said plurality of spaced tractive rods; and wherein at least the inner end of at least some of the plurality of spaced tractive rods includes a cone shaped end portion;

a drive means having driving surfaces configured to engage said cone shaped end portions in direct driving relationship; and a rail for supporting said belt for passage through an endless path including a helical portion extending through a plurality of vertically spaced loops with the belt curved laterally in each of said loops, an approach portion leading into a first loop at one end of said helical portion;

wherein said rail being configured with a predetermined radius of curvature to gradually bring the belt into engagement with the driving surfaces at the approach portion; and wherein said driving surfaces and said cone shaped end portions are configured to establish mating engagement along a line of overlap between one of said driving surfaces and one of said cone shaped end portions, said line of overlap increasing as the one of said cone shaped end portions is brought into engagement with said one of said driving surfaces proximate the approach portion.

\* \* \* \* \*